(12) United States Patent
Marko et al.

(10) Patent No.: US 6,347,216 B1
(45) Date of Patent: Feb. 12, 2002

(54) METHOD AND SYSTEM FOR PROVIDING GEOGRAPHIC SPECIFIC SERVICES IN A SATELLITE COMMUNICATIONS NETWORK

(75) Inventors: Paul D. Marko, Pembroke Pines; Craig P. Wadin, Sunrise, both of FL (US)

(73) Assignee: XM Satellite Radio Inc., Washington, DC (US)

(*) Notice: Subject to any disclaimer, the term of this patent is extended or adjusted under 35 U.S.C. 154(b) by 0 days.

(21) Appl. No.: 09/433,863

(22) Filed: Nov. 4, 1999

(51) Int. Cl.$^7$ .................................................. H04B 1/69
(52) U.S. Cl. ........................ 455/12.1; 455/13.1; 375/200
(58) Field of Search ............................. 455/12.1, 13.1, 455/16, 18, 20, 22; 375/200

(56) References Cited

U.S. PATENT DOCUMENTS

| | | | |
|---|---|---|---|
| 4,467,424 A | 8/1984 | Hedges et al. | 364/412 |
| 4,785,463 A | 11/1988 | Janc et al. | 375/1 |
| 5,235,633 A | 8/1993 | Dennison et al. | 379/60 |
| 5,278,863 A | 1/1994 | Briskman | 375/1 |
| 5,303,393 A * | 4/1994 | Noreen et al. | 455/3.2 |
| 5,319,673 A | 6/1994 | Briskman | 375/1 |
| 5,331,561 A | 7/1994 | Barrett et al. | 364/447 |
| 5,365,450 A | 11/1994 | Schuchman et al. | 364/449 |
| 5,365,451 A | 11/1994 | Wang et al. | 364/449 |
| 5,414,432 A | 5/1995 | Penny, Jr. et al. | 342/357 |
| 5,422,813 A | 6/1995 | Schuchman et al. | 364/449 |
| 5,430,656 A | 7/1995 | Dekel et al. | 364/449 |
| 5,455,823 A | 10/1995 | Noreen et al. | 370/50 |
| 5,485,485 A | 1/1996 | Briskman et al. | 375/200 |
| 5,499,032 A | 3/1996 | Kelley et al. | 342/357 |
| 5,524,081 A | 6/1996 | Paul | 364/460 |
| 5,592,471 A | 1/1997 | Briskman | 455/52.3 |
| 5,596,494 A | 1/1997 | Kuo | 364/420 |
| 5,636,245 A | 6/1997 | Ernst et al. | 375/259 |
| 5,689,245 A | 11/1997 | Noreen et al. | 340/825.9 |
| 5,720,039 A | 2/1998 | Lieberman | 455/10 |
| 5,745,839 A | 4/1998 | Lieberman | 455/10 |
| 5,794,138 A | 8/1998 | Briskman | 455/344 |
| 5,864,579 A * | 1/1999 | Briskman | 375/200 |
| 5,898,680 A | 4/1999 | Johnstone | 370/316 |
| 6,101,180 A * | 8/2000 | Donahue et al. | 370/352 |

FOREIGN PATENT DOCUMENTS

| | | | |
|---|---|---|---|
| EP | 0949771 | 10/1999 | H04H/1/00 |
| EP | 0959573 | 11/1999 | H04H/1/00 |

* cited by examiner

Primary Examiner—Daniel Hunter
Assistant Examiner—Alan T. Gantt
(74) Attorney, Agent, or Firm—Roylance, Abrams, Berdo & Goodman, LLP

(57) ABSTRACT

A method and apparatus for communicating geographic specific services to a receiver in a satellite communications network by utilizing location identification information included in a composite signal transmitted by a terrestrial repeater. A terrestrial repeater receives from a satellite a composite signal comprising a plurality of time-division multiplexed (TDM) data channels and retransmits the composite signal with a unique transmitter identification number which indicates the identity of the repeater. Upon reception of the composite signal from the terrestrial repeater, the receiver determines the current geographical location of the receiver based on the transmitter identification number. The receiver then compares the current location of the receiver to header information carried in the data channels to select information in the data channels is targeted to the geographical location of the receiver. The receiver then provides the selected information to a user of the receiver so that user may access services directed to audiences in the geographic location of the receiver.

27 Claims, 4 Drawing Sheets

METHOD AND SYSTEM FOR PROVIDING GEOGRAPHIC SPECIFIC SERVICES IN A SATELLITE COMMUNICATIONS NETWORK

RELATED APPLICATIONS

Related subject matter is disclosed and claimed in co-pending U.S. patent application Ser. No. 09/318,938, filed by Paul D. Marko et al on May 26, 1999; and in co-pending U.S. patent application Ser. No. 09/433,861 filed by Paul D. Marko even date herewith for "Method And Apparatus For Concatenated Convolutional Encoding And Interleaving" (Attorney File 38879); both applications being expressly incorporated herein by reference.

FIELD OF THE INVENTION

The present invention relates to a method and system for providing geographic specific services to a receiver in a satellite communications network. More particularly, the present invention relates to a method and system for providing geographic specific services to a receiver in a satellite digital audio radio service (SDARS) network by utilizing transmitter identification information included in a composite signal transmitted by a terrestrial repeater.

BACKGROUND OF THE INVENTION

Satellite digital audio radio service (SDARS) is a satellite broadcast service recently approved by the U.S. Federal Communications Commission (FCC) which provides satellite transmission of digital audio programs to compatible radio receivers. The radio receivers can be stationary or mobile and are generally configured to receive composite broadcast signals comprising a plurality of data channels from satellites as well as terrestrial repeaters.

As shown in FIG. 1, SDARS provides service to a receiver or subscriber 4 over a nationwide coverage area through the use of two geostationary satellites 1 and 2 and a terrestrial repeater network comprising a plurality of individual terrestrial repeaters 3. In particular, SDARS employs a spatial and frequency diversity system wherein one of the geostationary satellites 1 transmits a first signal on one transmission channel and the other geostationary satellite 2 transmits a second signal containing the same program material as the first signal on a second transmission channel. Upon reception, the first and second signals are stored at the receiver 4 so that the two channels can be combined, or the program material in the two channels selected, via suitable receiver circuitry.

The terrestrial repeaters 3 receive the signals from the geostationary satellite 1 or 2, and retransmit the signals using multi-carrier modulation (MCM). The terrestrial repeaters 3 are used for coverage reinforcement in areas which receive poor satellite coverage. Signal reception can be disrupted at the receiver 4 due to physical obstructions which interfere with line of sight (LOS) reception between the geostationary satellites 1 and 2 and the receiver 4, or service outages. For example, mobile receivers may encounter physical obstructions when they pass through tunnels or travel near buildings or trees that impede LOS signal reception. Service outages can occur, on the other hand, when noise or cancellations of multipath signal reflections are sufficiently high with respect to the desired signal.

All of the terrestrial repeaters 3 of the terrestrial repeater network simultaneously transmit the same data to all subscribers (i.e., receiver 4) in the coverage area with the exception that each of the terrestrial repeaters transmits additional information which allows the receiver to identify the individual terrestrial repeater from which the currently received signal is originating. In particular, each terrestrial repeater adds to the retransmitted composite signal a unique transmitter identification number which is embedded after an MCM synchronization pattern. Presently, the transmitter identification number is generally used for RF network coverage analysis and field testing.

Although the nationwide coverage area comprises a plurality of distinct geographic areas (e.g., the northeast, the southwest, and so on), the ability to provide geographic specific service is not inherent with the above-described system architecture. That is, all receivers or subscribers receive the same broadcast data regardless of their geographic location. Accordingly, this inhibits the transmission/reception of geographically targeted data such a local weather forecasts, news, advertisements, and so on.

Accordingly, it is an object of the present invention to provide a method and system for providing geographic specific services to receivers in an SDARS network, wherein a receiver can provide different types of broadcast information to a user based on the geographic location of the receiver.

SUMMARY OF THE INVENTION

In accordance with the present invention, a method and apparatus are provided for transmitting and receiving geographic specific services in a satellite communications network by utilizing location identification information included in a composite signal transmitted by a terrestrial repeater. In particular, the terrestrial repeater receives from a satellite a composite signal comprising a plurality of time-division-multiplexed (TDM) data channels and retransmits the composite signal along with a unique transmitter identification number which indicates the identity of an individual repeater. Upon reception of the composite signal from the terrestrial repeater, a receiver determines the current geographical location of the receiver based on the transmitter identification number. The receiver then compares the current location of the receiver to header information of packets or frames carried within the data channels to select geographically targeted information in the data channels. The receiver then provides the selected information to a user of the receiver so that the user may receive services directed to audiences in the geographic location of the receiver.

BRIEF DESCRIPTION OF THE DRAWINGS

A preferred embodiment of the present invention is described in detail below with reference to the attached drawing figures, in which.

DETAILED DESCRIPTION OF THE PREFERRED EMBODIMENT

Figure 1:
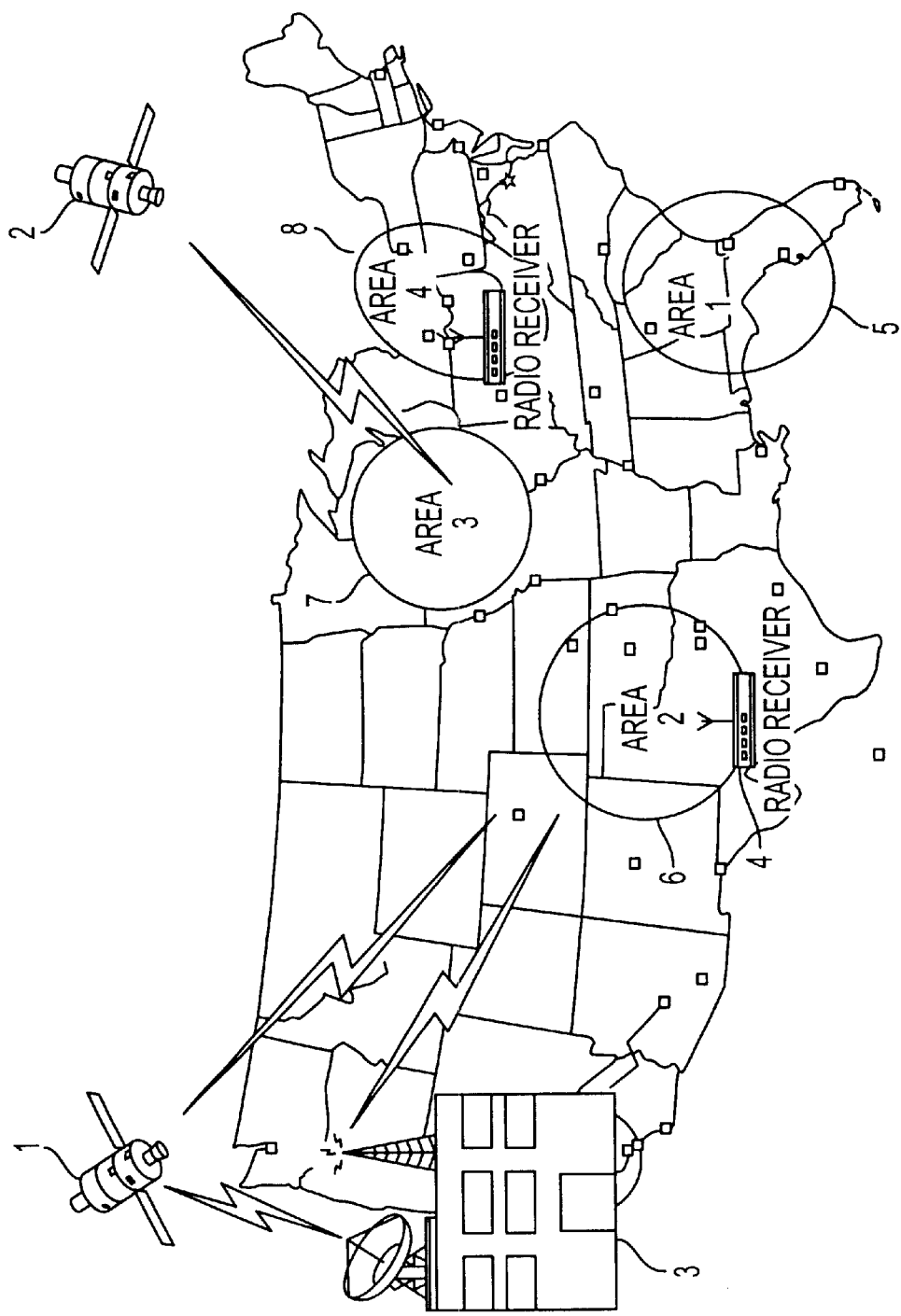
FIG. 1 is a block diagram of a communication system in accordance with a preferred embodiment of the present invention.
Figure 2:
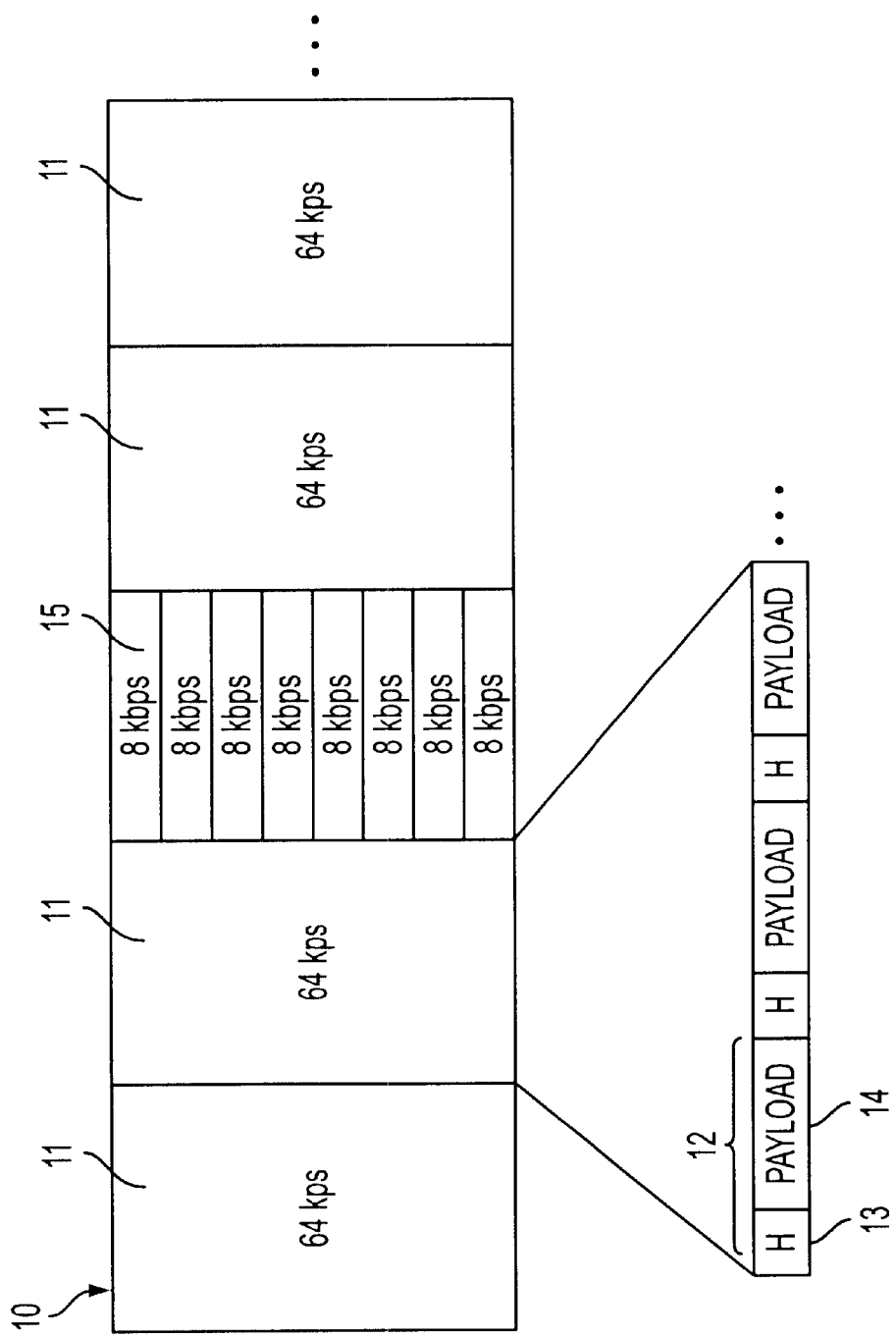
FIG. 2 illustrates the format of composite signal in accordance with the preferred embodiment of the present invention.

With reference to FIGS. 1 and 2, the geostationary satellites 1 and 2 and the terrestrial repeater 3 each transmit a composite signal 10 comprising a plurality of TDM channels 11. Each of the channels 11 comprises a plurality of multiplexed data packets 12 comprising a preamble/header 13 and a payload 14 of audio, video or other data. Alternatively, the multiplexed data packets 12 may be packaged in a frame (not shown) comprising a frame header with information regarding the individual data packets within the frame.

Figure 3:
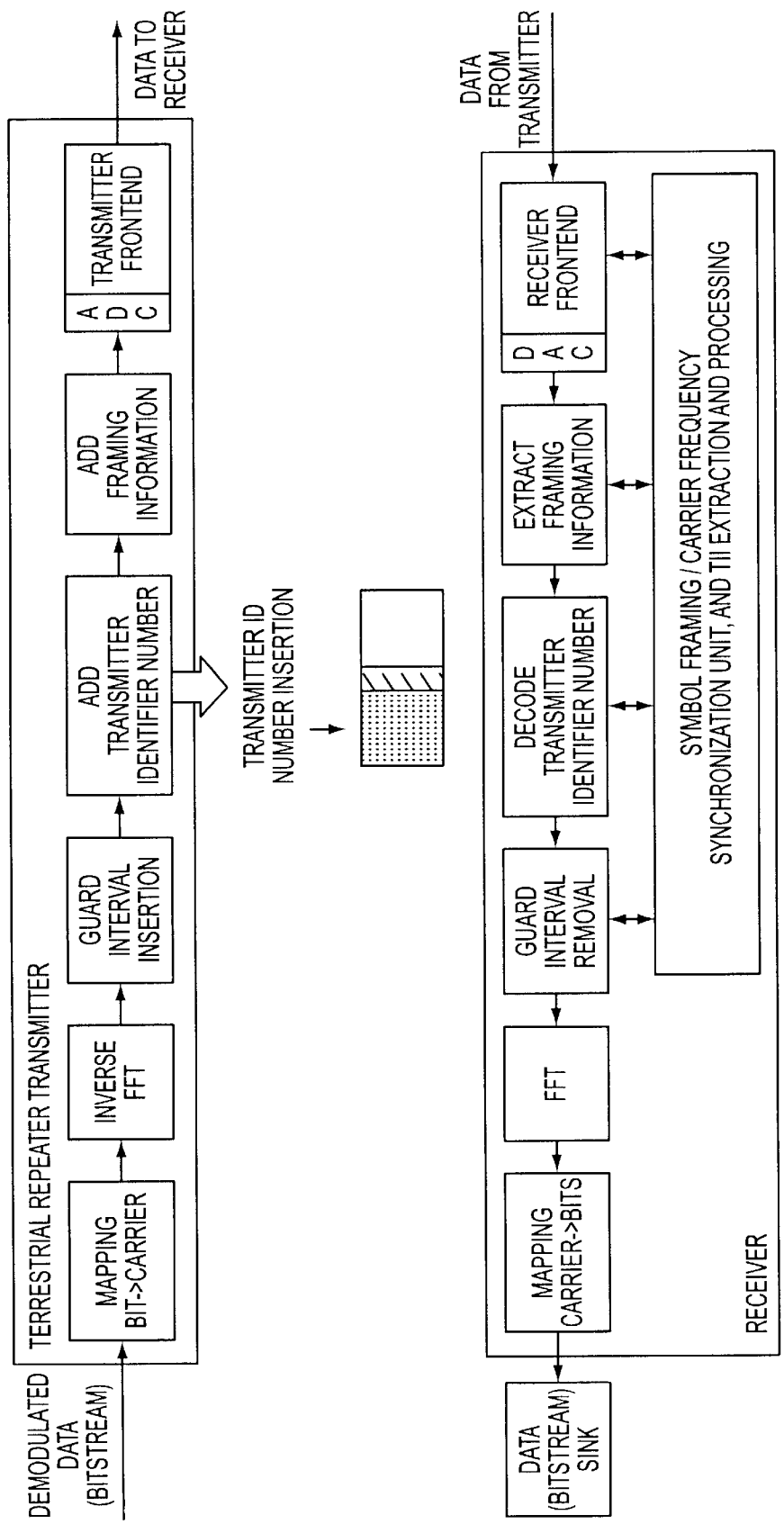
FIG. 3 is a block diagram illustrating a terrestrial repeater and a receiver in according with the preferred embodiment of the present invention.
Figure 4:
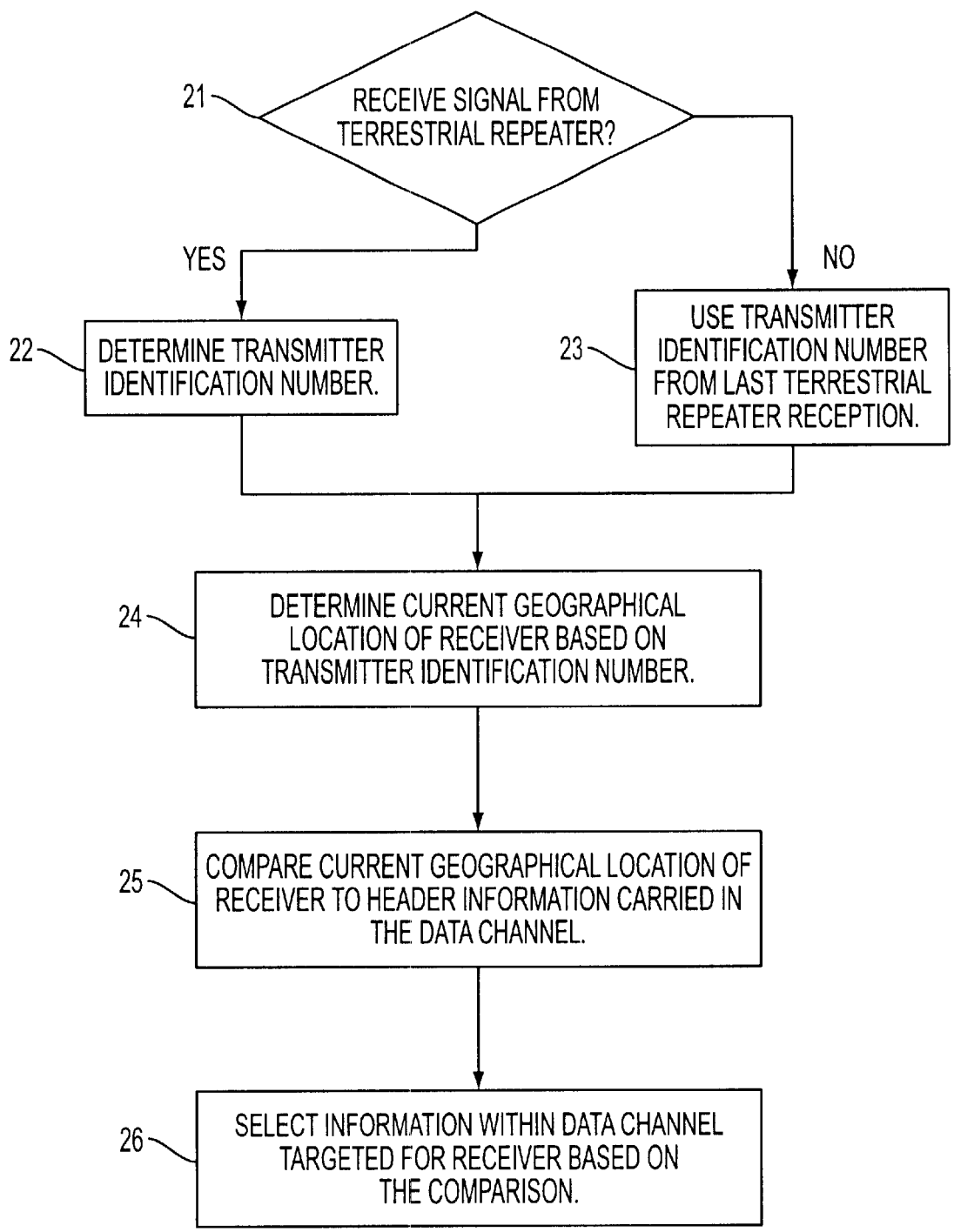
FIG. 4 is a flowchart illustrating a method of selecting geographically target information in accordance with the preferred embodiment of the present invention.

The composite signal 10 transmitted from each of the terrestrial repeaters 3 also includes the unique transmitter identification number which is embedded after an MCM synchronization signal in the header. In particular, the terrestrial repeater transmitter demodulates the composite signal received from the satellites 1 and 2 and then, as shown in FIG. 3, decodes, reformats, and frequency translates the demodulated bitstream data. In particular, the bits of incoming data are mapped to MCM carriers, and an inverse Fast Fourier Transfer function is performed to move from the frequency to the time domain. Next, a guard interval time is inserted to protect against inter-symbol interference and eight bits of transmitter identifier information are added prior to sync/framing information. The entire output is routed to an analog-to-digital (ADC) converter and the ADC output is applied to the transmitter modulation port. As shown in FIG. 4, the inverse process is performed at the receiver including extracting the transmitter identification information (TII). As discussed in detail below, the receiver 4 uses the transmitter identification number to determine the current geographical location of the receiver in order to select different categories of data to be provided to the user of the receiver based on the determined geographical location.

In particular, the individual data channels 11 of the composite signal that are transmitted nationwide by the system have the ability to define, through the use of header information, which geographical area the data is targeted for. That is, the information contained within each channel 11 of the composite signal can be subdivided into a plurality subchannels 15, wherein each of the subchannels 14 contains information directed to different geographically defined regions. The intended geographic region of each subchannel 15 is identified by information contained in the packet headers (or frame headers). For example, as shown in FIG. 2, a 64 kbps channel 11 can be divided into eight low-rate subchannels 15 (service components), wherein each subchannel 15 comprises 8 kbps of information and is targeted for a different geographic region. It should be noted that since the capacity of each channel may vary from 8 kbps to 1024 kbps, the number of subchannels within a particular channel is variable depending on the channel capacity and the capacity required for each subchannel.

With reference to FIG. 4, upon reception of the composite signal from the terrestrial repeater 3, the receiver 4 determines the transmitter identification number and the current location of the receiver 4 based on the transmitter identification number (steps 21 and 22). When the receiver 4 is located in an area of satellite only coverage (i.e., no terrestrial receiver signal reception is available), the transmitter identification number which was last received by the receiver is used (step 23). Based on the transmitter identification number, the receiver 4 then determines the current geographical location of the receiver 4 and compares the current location to the header information carried in the packets comprising the data channel to determine which information (subchannel) is available to the receiver 4 (steps 24 and 25). The receiver 4 then provides the selected information within the data channel to a user of the receiver 4 so that user may access services that are directed to audiences in the geographic location of the receiver 4 (step 26). This feature would be transparent to the user. Accordingly, the receiver can provide geographically targeted broadcast data, such as weather, sports scores, advertisements and the like, to subscribers.

In order to implement the method of preferred embodiment across multiple categories or regions, a given channel 11 must be capable of being allocated (e.g., up to 16 kbps) a predetermined capacity for the transmission of data. This would allow the simultaneous transmission of weather forecasts for locations throughout the country in order for a given radio to choose and provide forecast information pertinent to its category or geographic region. For example, four geographic regions 5–8 (FIG. 1) are defined so that the terrestrial repeaters within each particular geographic areas 5–8 would transmit same transmitter identification number grouping data. This would allow for a nationwide weather channel that would be assigned the same station number but carried several weather data streams with their associated geographical identifiers. When a user in geographic area 5 tuned to this channel, the user would only hear the weather information pertinent to geographic area 5 (the current location of the receiver).

Similarly, if a subscriber is listening to sports programming on a national sports channel, and this channel is providing sports scores, the subscriber might only receive scores for nationally known teams and small local schools within the geographical region in which the receiver is currently located. The system would accomplish this by having the service broadcast nationally the scores for local teams all around the country, flagging each group with the category for their region.

Another application of the preferred embodiment is geographically targeted advertisements, in a subdivided audio signal and/or a service information text, according to customer demographic or attitudinal traits. For example, a nationwide audio program could allocate time for an advertisement, wherein the advertisement would carry several unique commercial segments with different transmitter identification number data. In this manner, the subscriber receiver would only provide the audio for the advertisement relative to his location. Moreover, since advertisements generally have lower data rate or capacity requirements, they may be targeted at narrower audiences.

Although the present invention has been shown and described with respect to preferred embodiment, various changes and modifications within the scope of the invention will readily occur to those skilled in the art.

What is claimed is:

1. A communications method comprising the steps of:
   transmitting a data signal from a transmitter, said data signal comprising a plurality of data channels and information identifying said transmitter;
   receiving said data signal at a receiver; and
   selectively providing data contained in one of said data channels to a user of said receiver based on said information identifying said transmitter, said data being directed to users within a geographic area corresponding to the location of said transmitter.

2. The method according to claim 1, wherein said step of selectively providing data contained in one of said data channels comprises determining a geographical location of said receiver based on said information identifying said transmitter and selectively providing said data contained in one of said data channels to a user of said receiver based on said geographical location of said receiver.

3. The method according to claim 2, wherein at least one of said data channels comprises a plurality of sub-channels corresponding to a plurality of geographic regions and said step of selectively providing data contained in one of said data channels further comprises selecting one of said sub-channels based on said geographical location of said receiver and providing said data contained in said one of said sub-channels to said user of said receiver.

4. The method according to claim 3, wherein each of said sub-channels includes information identifying said geographic regions to which said sub-channels correspond.

5. The method according to claim 4, said information identifying said geographic regions to which said sub-channels correspond is provided in headers of data packets which comprise said sub-channels.

6. A communications method for transmitting and receiving geographically targeted information in a satellite communications network comprising a satellite, a plurality of terrestrial repeaters and a receiver, said method comprising the steps of:

transmitting a composite signal from one of said terrestrial repeaters, said composite signal comprising a plurality of data channels;

receiving at said receiver said composite signal transmitted from one of said terrestrial repeaters;

determining at said receiver a geographical location of said receiver based on information contained in said composite signal; and selectively providing information contained in one of said data channels to a user of said receiver based on said geographical location of said receiver.

7. The method according to claim 6, wherein at least one of said channels comprises a plurality of sub-channels each corresponding to a different geographic region, and said step of selectively providing information contained in one of said data channels further comprises selecting one of said sub-channels based on said geographical location of said receiver and providing said information contained in said one of said sub-channels to said user of said receiver.

8. The method according to claim 7, wherein said composite signal includes a transmitter identification number which is unique to said one of said terrestrial repeaters and said step of determining said geographical location of said receiver comprises determining said geographical location of said receiver based on said transmitter identification number.

9. The method according to claim 7, wherein each of said sub-channels includes information identifying said geographic regions to which said sub-channels correspond.

10. The method according to claim 6, wherein said composite signal comprises a time division multiplexed (TDM) signal.

11. A communications method for transmitting and receiving geographically targeted information in a satellite communications network comprising a satellite, a plurality of terrestrial repeaters, and a receiver, said method comprising the steps of:

transmitting a first composite signal from said satellite, said composite signal comprising a plurality of data channels;

receiving said first composite signal at one of said terrestrial repeaters;

retransmitting said first composite signal from said one of said terrestrial repeaters as a second composite signal comprising said plurality of data channels and information identifying said one of said terrestrial repeaters;

receiving at said receiver said second composite signal transmitted from said one of said terrestrial repeaters;

determining at said receiver a geographical location of said receiver based on said information identifying said one of said terrestrial repeaters; and selecting information contained in one of said data channels based on said geographical location of said receiver and providing said information to a user of said receiver.

12. The method according to claim 11, wherein at least one of said channels comprises a plurality of sub-channels corresponding to a plurality of geographic regions, and said step of selecting information contained in one of said data channels further comprises selecting one of said sub-channels based on said geographical location of said receiver and providing information contained in said one of said sub-channels to said user of said receiver.

13. The method according to claim 12, wherein each of said sub-channels includes information identifying said geographic regions to which said sub-channels correspond.

14. The method according to claim 11, wherein said information identifying said one of said terrestrial repeaters comprises a unique transmitter identification number.

15. A communications system comprising:

at least one satellite for transmitting a first composite data signal comprising a plurality of data channels;

at least one terrestrial repeater for receiving said first composite data signal from said satellite and retransmitting said first composite data signal as a second composite data signal comprising said plurality of data channels and information identifying said terrestrial repeater; and a receiver for receiving said second composite signal transmitted from said terrestrial repeater and selectively providing program information contained in one of said data channels to a user of said receiver based on said information identifying said terrestrial repeater, said program information being directed to users within a geographic area corresponding to the location of said transmitter.

16. The communications system according to claim 15, wherein at least one of said channels comprises a plurality of sub-channels corresponding to a plurality of geographic regions, and said receiver selectively provides information contained in one of said channels by determining a geographical location of said receiver based on said information identifying said transmitter, selecting one of said sub-channels based on said geographical location of said receiver and providing said information contained in said one of said sub-channels to said user of said receiver.

17. The communications system according to claim 15, wherein said information identifying said terrestrial repeater comprises a transmitter identification number which is unique to said terrestrial repeater.

18. A communications method comprising the steps of:

transmitting a data signal from a transmitter, said data signal comprising a plurality of data channels and information identifying said transmitter;

receiving said data signal at a receiver; and selectively providing data contained in one of said data channels to a user of said receiver based on said information identifying said transmitter;

wherein said step of selectively providing data contained in one of said data channels comprises determining a geographical location of said receiver based on said information identifying said transmitter and selectively providing said data contained in one of said data channels to a user of said receiver based on said geographical location of said receiver; and wherein at least one of said data channels comprises a plurality of sub-channels corresponding to a plurality of geographic regions and said step of selectively providing data contained in one of said data channels further comprises selecting one of said sub-channels based on said geographical location of said receiver and providing said data contained in said one of said sub-channels to said user of said receiver.

19. The method according to claim 18, wherein each of said sub-channels includes information identifying said geographic regions to which said sub-channels correspond.

20. The method according to claim 19, said information identifying said geographic regions to which said sub-channels correspond is provided in headers of data packets which comprise said sub-channels.

21. A communications method for transmitting and receiving geographically targeted information in a satellite communications network comprising a satellite, a plurality of terrestrial repeaters and a receiver, said method comprising the steps of:

transmitting a composite signal from one of said terrestrial repeaters, said composite signal comprising a plurality of data channels;

receiving at said receiver said composite signal transmitted from one of said terrestrial repeaters;

determining at said receiver a geographical location of said receiver based on information contained in said composite signal; and selectively providing information contained in one of said data channels to a user of said receiver based on said geographical location of said receiver;

wherein at least one of said channels comprises a plurality of sub-channels each corresponding to a different geographic region, and said step of selectively providing information contained in one of said data channels further comprises selecting one of said sub-channels based on said geographical location of said receiver and providing said information contained in said one of said sub-channels to said user of said receiver;

wherein said composite signal includes a transmitter identification number which is unique to said one of said terrestrial repeaters and said step of determining said geographical location of said receiver comprises determining said geographical location of said receiver based on said transmitter identification number.

22. A communications method for transmitting and receiving geographically targeted information in a satellite communications network comprising a satellite, a plurality of terrestrial repeaters and a receiver, said method comprising the steps of:

transmitting a composite signal from one of said terrestrial repeaters, said composite signal comprising a plurality of data channels;

receiving at said receiver said composite signal transmitted from one of said terrestrial repeaters;

determining at said receiver a geographical location of said receiver based on information contained in said composite signal; and selectively providing information contained in one of said data channels to a user of said receiver based on said geographical location of said receiver;

wherein at least one of said channels comprises a plurality of sub-channels each corresponding to a different geographic region, and said step of selectively providing information contained in one of said data channels further comprises selecting one of said sub-channels based on said geographical location of said receiver and providing said information contained in said one of said sub-channels to said user of said receiver;

wherein each of said sub-channels includes information identifying said geographic regions to which said sub-channels correspond.

23. The method according to claim 22, wherein said information identifying said geographic regions to which said sub-channels correspond is provided in headers of data packets which comprise said sub-channels.

24. A communications method for transmitting and receiving geographically targeted information in a satellite communications network comprising a satellite, a plurality of terrestrial repeaters, and a receiver, said method comprising the steps of:

transmitting a first composite signal from said satellite, said composite signal comprising a plurality of data channels;

receiving said first composite signal at one of said terrestrial repeaters;

retransmitting said first composite signal from said one of said terrestrial repeaters as a second composite signal comprising said plurality of data channels and information identifying said one of said terrestrial repeaters;

receiving at said receiver said second composite signal transmitted from said one of said terrestrial repeaters;

determining at said receiver a geographical location of said receiver based on said information identifying said one of said terrestrial repeaters; and selecting information contained in one of said data channels based on said geographical location of said receiver and providing said information to a user of said receiver;

wherein at least one of said channels comprises a plurality of sub-channels corresponding to a plurality of geographic regions, and said step of selecting information contained in one of said data channels further comprises selecting one of said sub-channels based on said geographical location of said receiver and providing information contained in said one of said sub-channels to said user of said receiver;

wherein each of said sub-channels includes information identifying said geographic regions to which said sub-channels correspond.

25. The method according to claim 24, wherein said information identifying said geographic regions to which said sub-channels correspond is provided in headers of data packets which comprise said sub-channels.

26. A communications method for transmitting and receiving geographically targeted information in a satellite communications network comprising a satellite, a plurality of terrestrial repeaters, and a receiver, said method comprising the steps of:

transmitting a first composite signal from said satellite, said composite signal comprising a plurality of data channels;

receiving said first composite signal at one of said terrestrial repeaters;

retransmitting said first composite signal from said one of said terrestrial repeaters as a second composite signal comprising said plurality of data channels and information identifying said one of said terrestrial repeaters;

receiving at said receiver said second composite signal transmitted from said one of said terrestrial repeaters;

determining at said receiver a geographical location of said receiver based on said information identifying said one of said terrestrial repeaters; and selecting information contained in one of said data channels based on said geographical location of said receiver and providing said information to a user of said receiver;

wherein said information identifying said one of said terrestrial repeaters comprises a unique transmitter identification number.

27. A communications system comprising:

at least one satellite for transmitting a first composite data signal comprising a plurality of data channels;

at least one terrestrial repeater for receiving said first composite data signal from said satellite and retransmitting said first composite data signal as a second composite data signal comprising said plurality of data channels and information identifying said terrestrial repeater; and a receiver for receiving said second composite signal transmitted from said terrestrial repeater and selectively providing information contained in one of said data channels to a user of said receiver based on said information identifying said terrestrial repeater;

wherein said information identifying said terrestrial repeater comprises a transmitter identification number which is unique to said terrestrial repeater.

* * * * *